United States Patent [19]
Bittel

[11] 3,886,340
[45] May 27, 1975

[54] MEANS FOR POSITIONING A MODULE IN AN ELECTRIC MOTOR CONTROL SWITCH
[76] Inventor: Robert W. Bittel, 11707 Woodview Boulevard, Parma Heights, Ohio 44130
[22] Filed: Aug. 14, 1972
[21] Appl. No.: 280,359

[52] U.S. Cl.............................. 200/293, 200/157
[51] Int. Cl......................... H01h 9/02; H01h 13/08
[58] Field of Search......... 317/112; 200/157, 168 R; 317/101 A, 101 B, 101 C

[56] References Cited
UNITED STATES PATENTS

| 3,484,632 | 12/1969 | Opalenik | 200/157 X |
|---|---|---|---|
| 3,536,973 | 10/1970 | Matthews et al. | 200/157 X |
| 3,603,757 | 9/1971 | Sahrbacker | 200/157 |
| 3,629,534 | 12/1971 | Reviel | 200/157 |

Primary Examiner—Robert K. Schaefer
Assistant Examiner—William J. Smith
Attorney, Agent, or Firm—George S. Baldwin et al.

[57] ABSTRACT

A compact electric switch for controlling an electric motor, with the switch including a sectional, removable module member having various of the switch circuit components thereon and therein, with the module member being adapted to be received in a housing member and retained therein in coacting relation with respect to movable electrical contacts in the upper portion of the housing member, which movable contacts are adapted for actuation or movement by an operator, such as for instance, a finger actuated trigger. Projecting means are provided on one of the members for coaction with means on the other member for accurately locating the module member in the housing and with respect to the movable electrical contacts thereof. The purpose is to accurately and expeditiously position the module member of the switch interiorly of and with respect to the housing member of the switch assembly.

14 Claims, 7 Drawing Figures 3,886,340

MEANS FOR POSITIONING A MODULE IN AN ELECTRIC MOTOR CONTROL SWITCH

This invention relates in general to a compact electrical or electronic switch for controlling an electric power unit and, more particularly, to a compact electrical switch for controlling an electric motor, such as, for instance, an electric motor of a hand operated power tool, utensil, appliance or the like, and wherein the switch control includes a module member having various circuit components mounted thereon and therein, and which module is adapted for positioning in an exterior housing member for locating the module member with respect to the housing member and associated movable electrical contacts therein.

BACKGROUND OF THE INVENTION

Control switches of the general type of the present invention are known in the prior art, and are used extensively for controlling an electrical power unit such as for instance an electric motor of an electric hand-type portable tool or utensil. The present invention relates in general to the type of switch shown, for instance, in U.S. Pat. No. 3,536,973 issued Oct. 27, 1970 in the name of B. H. Matthews et al. and entitled Switch and Speed Control for An Electric Motor, and also of the type disclosed in the copending U.S. Pat. application Ser. No. 170,496 filed Aug. 10, 1971 by Benjamin H. Matthews et al. and entitled Electronic Switch Module with Ceramic Case. The switches disclosed in such prior patent applications include a speed control module formed of some type of insulating material, such as, for instance, plastic, and which mounts various components of the switch circuit therein and thereon, and which is adapted to be slidably received in an exterior housing or wrap around member of the switch. Heretofore, the positioning of the speed control module within the housing or wrap around was accomplished by guiding coaction between the end walls of the recess in the housing and the end of the module. Due to manufacturing tolerances and other problems involved in the manufacture of the housing and the switch module, problems may occur in connection with accurately positioning the module in the housing, and with respect to the movable electrical contact members located in the upper portion of the housing.

SUMMARY OF THE INVENTION

The present invention provides an electrical switch for use with portable hand tools, utensils, appliances or the like, and wherein the switch includes a switch module and a wrap around or housing member receiving said module therein, with means provided in the housing which is adapted to coact with means provided on the switch module, for precisely and accurately locating the module, and thus accurately locating the switch circuit components mounted thereon with respect to the housing, and with respect to movable electrical contact means conventionally disposed in the upper portion of the housing, and which are adapted to coact with certain of the circuit components on the module, in the assembled condition of the module with the housing member of the switch assembly.

Accordingly, an object of the invention is to provide a novel electrical control switch.

Another object of the invention is to provide a novel electrical control switch embodying variable speed type control.

Another object of the invention is to provide an electrical control switch assembly comprising finger actuated, movable bridging electrical contact means for making and breaking the switch circuit, and wherein actuation of the switch assembly automatically actuates an arrangement which varies the magnitude of electrical energy input to an associated electric motor, and wherein the switch includes a speed control module having various electrical circuit components mounted thereon and therein for speed control, and which includes cam means formed on the module case, adapted for camming coaction with the bridging contact means upon movement of the latter due to actuation thereof, and with such cam means being adapted to coact in gripped relation with guide positioning means on said housing, for accurately locating the speed control module of the switch with respect to the housing and with respect to the aforementioned bridging contact means.

Another object of the invention is to provide a trigger-switch assembly of the latter mentioned type which is of a highly compact, economical nature, and which is expeditiously manufacturable and assemblable, and capable of being mass produced.

A still further object of the invention is to provide a housing for an electric control switch which embodies a chamber adapted to receive a speed control module therein, and which includes spaced projection means on the housing interior adapted for coaction with projection means on the speed control module casing, and with such projection means on the module casing being also adapted for camming coaction with bridging electrical contact means of the switch circuit for maintaining the off condition of the switch.

Other objects and advantages of the invention will be apparent from the following description taken in conjunction with the accompanying drawings wherein:

DESCRIPTION OF THE PREFERRED EMBODIMENTS

Figure 1:
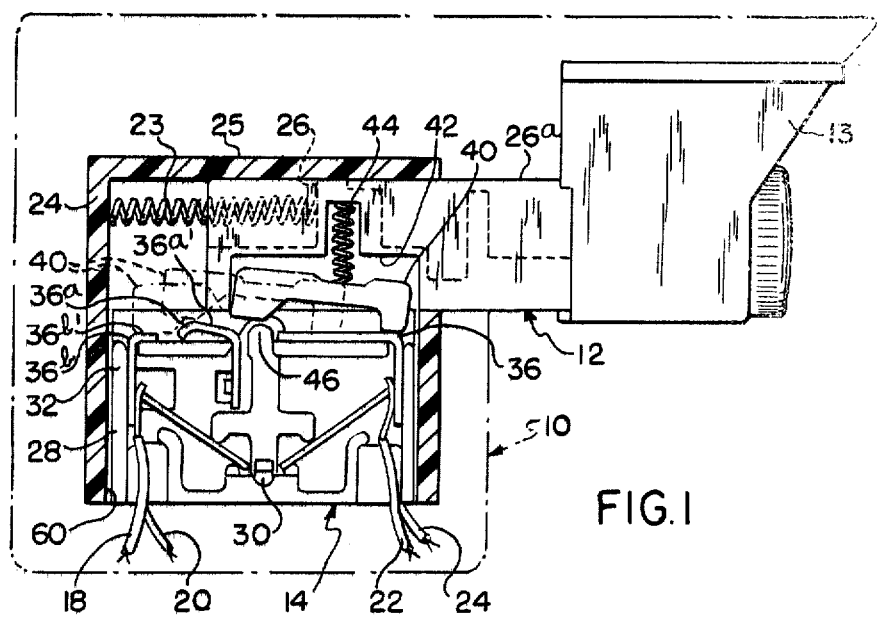
FIG. 1 is an enlarged, sectional, elevational view of a trigger-switch assembly embodying the invention.

Referring now again to the drawings, and particularly to FIG. 1 thereof, the latter illustrates with reference number 10, and with phantom lines, a portion of hand tool or utensil, with which the present invention may be incorporated. The portion shown is that conventionally known as the pistol grip section of a portable type tool, and which may include trigger-switch assembly 12 mounted thereon, adapted to control the operation of an electrical power unit, such as an electric motor (not shown) powering the tool. The trigger 13 of the trigger-switch assembly 12 may be of the reciprocal spring loaded ype, and which coacts with the switch mechanism in a known manner for actuation of the latter.

Electrical leads 18 and 20 may extend from the speed control module 14 of the switch assembly, to form part of an electrical cord for coupling the tool to a suitable source of electrical power, and electrical leads 22 and 24 may also extend from the switch module 14 and form the connection to the electric motor that is controlled by the trigger-switch assembly. A spring 23 coacting between the rear wall 24 of the switch housing or wrap around 25, and a recess 26 in the slide portion 26a of the trigger 13, acts to urge the trigger outwardly of the housing or wrap around 25 to an off position.

Figure 2:
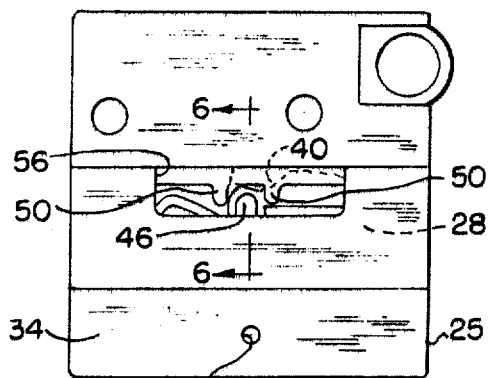
FIG. 2 is an enlarged, elevational view of the switch housing shown in FIG. 1, and illustrating a speed control module casing inserted in the receiving chamber in the housing, and with the cam means on the module casing coacting with projecting finger means on the housing, for positively and accurately aligning the speed control module with respect to the housing and with respect to the movable electrical contact means located in the switch housing.
Figure 3:
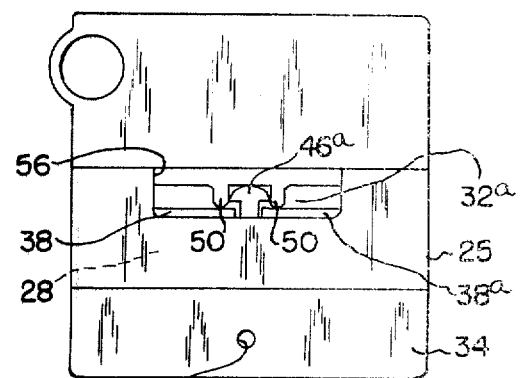
FIG. 3 is an elevational view taken from the opposite side as that of FIG. 2, and illustrating the cam means on the other side of the module casing which coacts with spaced projecting finger means in the housing for aligning and positioning the other side of the module casing.
Figure 4:
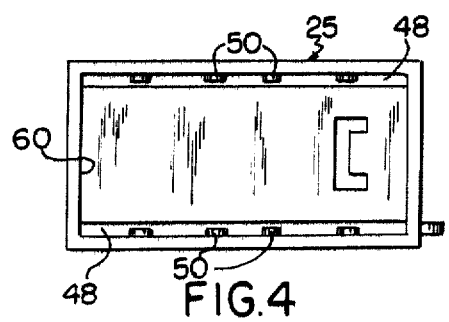
FIG. 4 is a bottom planned view of the housing or wrap around of FIGS. 2 and 3, and illustrating the aforementioned projecting finger means formed in the interior of the housing, for aligning the module casing.
Figure 7:
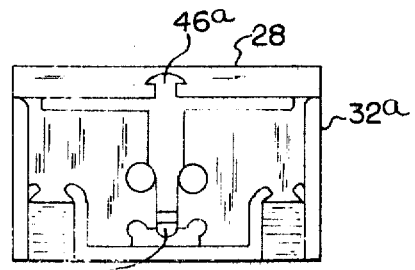
FIG. 7 is an elevational view of the module casing taken from the opposite side thereof as compared to that of FIG. 1.

The circuit components of the speed control module portion 14 are housed primarily in and on a split, two section casing 28 (FIGS. 1, 2, 3, and 5) which is received within the open lower section of the aforementioned switch housing 25. Module 14 is adapted to be secured and fastened in predetermined position in the housing 25. In this connection, each module section 32, 32a may be provided with a projection 30 (FIGS. 1 and 7) formed on the outer side thereof, and which is adapted to be received in generally snap-fastened relation in a complementary opening 33 in the confronting side of the wrap around or housing 25, when the assembled module 14 is inserted into the underside of the housing 25, thus removably retaining the speed control module therein. Housing 25 is formed of electrical insulating material, such as, for instance, plastic, with the lower sections of the side walls 34 thereof (FIGS. 2, 3 and 4) being suitably resilient or yieldable, for receiving the laterally extending projections 30 on the assembled module casing 28, and in the aforementioned openings 33.

Figure 5:
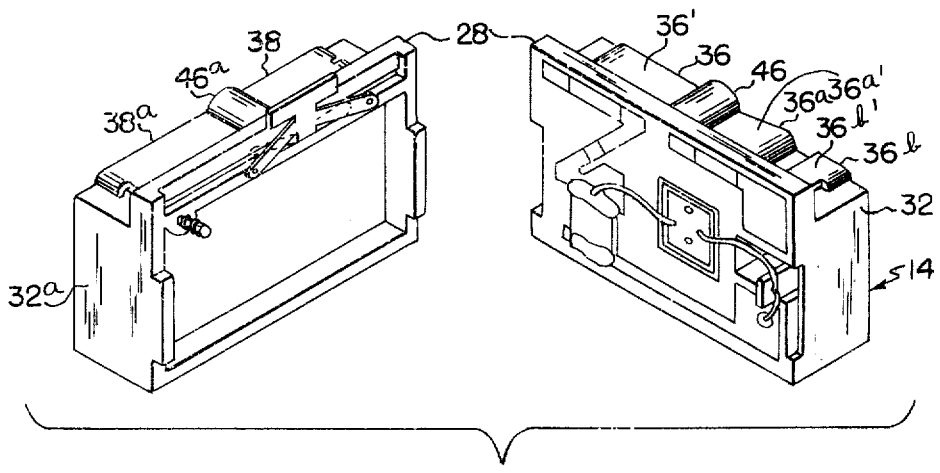
FIG. 5 is a generally perspective illustration of the separated sections of the switch module casing illustrating circuit component thereon, and showing the camming projection formed on each module section, which projection is also utilized in aligning and positioning the module casing with respect to the housing.

Casing section 32 may be formed of ceramic material and has a group of stationary contacts mounted thereon together with various components of the speed control circuit, and in a known manner. Reference may be had to aforementioned copending U. S. Pat. application Ser. No. 170,496, for a more detailed discussion of the circuitry arrangement which is mounted on and in casing sections 32, 32a. Briefly, however, section 32 has mounted on the upper surface thereof and extending generally lengthwise therealong, a set of electrically conducting spaced stationary contacts 36, 36a and 36b respectively (FIGS. 1 and 5). Contacts 36 and 36b have generally horizontally extending contact surface portions 36', 36b' respectively, while stationary contact 36a disposed intermediate contacts 36, 36b has a generally diagonally upwardly extending camming surface portion 36a' thereon, which extends to a level above surface portion 36b' of stationary contact 36b (FIG. 1)

Switch casing section 32a (FIGS. 5 and 7) which may be formed of electrically insulating materials, such as, for instance, plastic, has mounted thereon a group of stationary electrically conducting contacts 38, 38a. The switch illustrated is of the type which makes and breaks contacts on both sides of the electrical energy source. In other words, there is a substantially simultaneous making and breaking of the circuit on both conducting lines, and as discussed in aforementioned U. S. Pat. No. 3,536,973. In this connection, associated with each of the sets of stationary contacts, is a bridging contact number 40, and substantially as shown in U.S. Pat. No. 3,536,973. Each bridging contact member comprises an elongated body portion of electrically conducting material received in an associated slot 42 (FIG. 1) in the corresponding side of the body portion of movable trigger 13. Thus the bridging contact members are movable with the trigger during inward and outward movement of the trigger into and out of the housing portion 25. Each bridging contact member may have a spring 44 coacting therewith, for urging the movable contact member downwardly toward the underlying set of stationary contacts.

Each casing section 32,32a may have an abutment or cam projection 46 or 46a extending upwardly with respect thereto, for maintaining the associated bridging contact member 40 in an upwardly swung position with respect to an underlying stationary contact, when the trigger is in the off position and as illustrated, for instance, in full lines in FIG. 1. The cam abutment 46 of casing section 32, in the embodiment illustrated, is of slightly different configuration as compared to the cam abutment 46a of casing section 32a, and as can be readily seen from FIGS. 2 and 3. However, the general function of such cam abutment is the same, and it is necessary that the module casing 28 of the control switch be properly and accurately positioned in the housing 25, so that the coaction between the bridging contacts on the trigger and the underlying stationary contacts on the module casing 28 occur at the proper time and in the desired sequence. Accordingly, it is highly desirable that the module 14 be accurately located in predetermined position with respect to and within the wrap around or housing 25.

Figure 6:
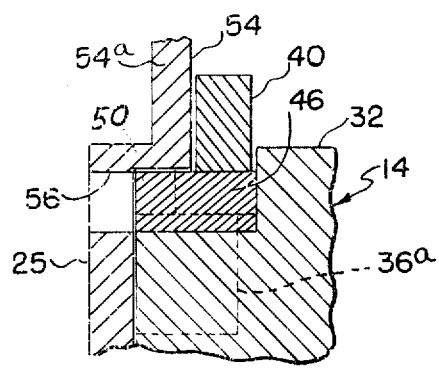
FIG. 6 is an enlarged, sectional view taken generally along the plane of line 6—6 of FIG. 2.

In this connection, housing 25 conventionally has internal, downwardly facing shoulders 48 which extend lengthwise of the housing. Such shoulders are each provided with a pair of generally centrally located resilient projections or fingers 50 which accurately position or locate the module 14 with respect to the housing 25 by guiding coaction of the fingers with the respective cam projection 46 or 46a on the respective casing section of the module 14. As can be seen from FIGS. 2, 3 and 6, the cam projection is received in snug engaged relation at its outermost end between the respective pair of such guiding fingers and is, therefore, centered on both sides thereof with respect to the chamber or cavity in the housing 25. As can be best seen from FIG. 6, the fingers 50 formed in the lower chamber of the housing 25, are disposed laterally outwardly of the inner surface 54 of the upper portion 54a of the side wall of the wrap around 25 and, thus, only engage the outer end of the respective cam projection on the respective module casing section. Openings 56 may be provided in the housing adjacent the sets of fingers 50, which openings facilitate the formation of the fingers during the molding operation on the housing. However, it will be understood that the openings 56 could be closed over, which would then completely enclose the wrap around except for the bottom entry opening 60 (FIG. 1) through which module 14 is received. With the module 14 accurately positioned in the housing, proper operation of the switch assembly occurs during movement of the trigger, and thus movement of the bridging contacts with respect to the stationary contacts of the control switch.

From the foregoing discussion and accompanying drawings, it will be seen that the invention provides a novel electrical switch for controlling an electric power unit and wherein the switch includes a housing which is adapted to receive therein a switch module mounting various of the switch components thereon, and with means on the housing adapted to coact with means on the module casing for accurately and effectively locating the module casing with respect to the housing of the switch assembly, which arrangement improves the operation and reliability of the control switch.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a compact electronic switch for controlling an electric power unit comprising, a housing member, a switch module member received in said housing member, and means on said module member coacting with means on said housing member for positioning said module member in predetermined location with respect to said housing member, said means including projecting means comprising a laterally extending cam surface on said module member received in gripped relation between projecting finger means on said housing member.

2. A switch in accordance with claim 1 wherein said projecting means comprises a laterally extending cam surface on said module member received in gripped relation between projecting finger means on said housing member.

3. A switch in accordance with claim 1 wherein said module member is of sectional construction for mounting switch circuit components therein and thereon and which when in assembled relationship forms a compact module member received in a chamber of said housing member, and which is located therein by said projecting means and said complementary means.

4. A switch module in accordance with claim 3 wherein at least one section of said module member is formed of ceramic material, certain of said circuit components being printed conductors on said one ceramic section.

5. A switch in accordance with claim 3 wherein each of said module sections are of a generally polygonal shaped configuration in side elevation, each said section having an inner side surface and an outer side surface, said inner side surfaces adapted for confronting relation in the assembled condition of said module sections, projecting means being located on said module member on said outer side surface of each section.

6. A switch in accordance with claim 1 including movable electrical contact means mounted in said housing member in coacting relation relative to said module member, said projecting means being adapted for coaction with said contact means for causing predetermined positioning of the latter.

7. A switch in accordance with claim 6 including actuator means operably coupled to said movable contact means for causing movement of the latter relative to said module member, said module member having stationary contact means mounted thereon adapted for coaction with said movable contact means for controlling operation of the power unit.

8. A switch in accordance with claim 6 wherin said projecting means includes a cam surface for camming coaction with said electrical contact means, said surface including an area for contact with said contact means and another area disposed laterally of the first mentioned area, said other area being received in the complementary means on the other of the members for positioning the module member with respect to the housing member.

9. A switch in accordance with claim 8 wherein said surface is of generally convex configuration in transverse cross section.

10. A switch in accordance with claim 8 wherein said complementary means comprises a pair of spaced generally resilient fingers on said other member receiving therebetween in gripped relation said other area of said projecting means.

11. A switch in accordance with claim 3 wherein said module member includes at least two spaced groups of stationary contacts mounted thereon, a bridging electrical contact member, associated with and movable with respect to each group of said stationary contacts, and from an off position wherein at least one of the bridging contact members is spaced from at least one of the stationary contacts of its associated group of stationary contacts to an on position wherein the bridging contact member engages two contacts of its associated group of stationary contacts in electrical conducting relation, each of said bridging contact members being adapted for connection to a respective conducting line from a source of electrical energy, for opening and closing the conducting line upon predetermined movement of the bridging contact member with respect to its group of stationary contacts, said projecting means coacting in camming relation with the associated bridging contact member in the off position of the switch.

12. A switch in accordance with claim 11 wherein said projecting means comprises a generally convex cam surface integrally formed on each respective module section generally centrally thereof in a direction lengthwise thereof and projects above the stationary contacts of the associated group of stationary contacts.

13. A switch in accordance with claim 1 wherein said module member comprises a pair of inter-fitting, separable module sections, one of said sections being formed of ceramic material, the other of said sections being formed of plastic material, each of said sections mounting a group of stationary electrical contacts thereon, a bridging electrically conducting member coacting with each group of stationary contacts, cam means formed on each section adapted for coaction with the associated bridging contact member in the off position of the switch for maintaining the bridging member out of contact with a predetermined one of the stationary contacts of the respective group, and means coacting with the cam means on the housing member for aligning the module member with respect to the housing member, the last mentioned coacting means comprising spaced projections on the respective side of the housing member in the interior thereof, and coacting with the lateral extremity of the respective cam means on the respective module section.

14. A switch in accordance with claim 13 wherein said spaced projections comprise resilient fingers formed integrally with said housing member and extending downwardly for coaction with the respective upwardly facing cam means.

* * * * *